US012624668B2

(12) United States Patent
Graziano et al.

(10) Patent No.: US 12,624,668 B2
(45) Date of Patent: May 12, 2026

(54) ENGINE SYSTEM AND METHOD FOR DETERMINING FUEL CHARACTERISTICS

(71) Applicant: Caterpillar Inc., Peoria, IL (US)

(72) Inventors: Michael Graziano, Washington, IL (US); Jason J. Rasmussen, Hopewell, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/775,864

(22) Filed: Jul. 17, 2024

(65) Prior Publication Data

US 2026/0022672 A1 Jan. 22, 2026

(51) Int. Cl.
*F02D 19/06* (2006.01)
*F02D 19/02* (2006.01)
(Continued)

(52) U.S. Cl.
CPC ....... *F02D 19/0628* (2013.01); *F02D 19/029* (2013.01); *F02D 19/0605* (2013.01); *F02D 19/0636* (2013.01); *F02D 19/0642* (2013.01); *F02D 19/0678* (2013.01); *F02D 41/0027* (2013.01); *F02P 5/1502* (2013.01);
(Continued)

(58) Field of Classification Search
CPC ...... F02D 19/02; F02D 19/022; F02D 19/027; F02D 19/029; F02D 19/0605; F02D 19/0628; F02D 19/0634; F02D 19/0636; F02D 19/0642; F02D 19/0678; F02D 41/0027; F02D 2200/0602; F02P 5/1502; G01N 9/26; G01N 9/266
See application file for complete search history.

(56) References Cited

U.S. PATENT DOCUMENTS 5,697,346 A * 12/1997 Beck .................... F02D 19/029 73/23.31
8,516,991 B2 8/2013 Tanno et al.
(Continued)

FOREIGN PATENT DOCUMENTS

DE 102007009565 A1 8/2008
JP H02233872 A 9/1990
(Continued)

OTHER PUBLICATIONS

Written Opinion and International Search Report for Int'l. Patent Appln. No. PCT/US2025/034309, mailed Sep. 26, 2025 (24 pgs).

*Primary Examiner* — John M Zaleskas
(74) *Attorney, Agent, or Firm* — Bookoff McAndrews, PLLC

(57) ABSTRACT

A method for determining a fuel characteristic, the method including receiving a gaseous fuel within a gaseous fuel rail of a dual fuel engine configured to run on at least the gaseous fuel and a diesel fuel. The method may include receiving a pressure signal from a pressure sensor indicating a pressure of the gaseous fuel within the gaseous fuel rail, and identifying at least one of an amplitude and a phase of the pressure signal, The method may further include determining a characteristic of the fuel within the fuel rail based on the amplitude or the phase of the pressure signal, and, based on the determined characteristic of the fuel, modifying an operational parameter of the dual fuel engine.

20 Claims, 9 Drawing Sheets

(51) Int. Cl.
*F02D 41/00* (2006.01)
*F02P 5/15* (2006.01)

(52) U.S. Cl.
CPC ................ *F02D 2200/0602* (2013.01); *F02D 2200/0612* (2013.01)

(56) References Cited

U.S. PATENT DOCUMENTS 9,528,922 B2 12/2016 Sivasubramanian et al.
9,546,941 B2 1/2017 Rasmussen et al.
9,732,961 B2 8/2017 Holcomb et al.
9,797,334 B2 10/2017 Anderson et al.
2003/0093184 A1* 5/2003 Tanaka ...................... F02C 9/32 700/289
2011/0088657 A1* 4/2011 Tanno ................... F02D 19/061 123/305
2012/0020384 A1* 1/2012 Mikami .............. F02D 41/3836 374/144
2012/0079831 A1* 4/2012 Kirzhner ................. F02C 7/264 60/776
2013/0233056 A1 9/2013 Ishiguro
2014/0366839 A1* 12/2014 Sivasubramanian ........................ F02D 19/105 123/352
2014/0366840 A1* 12/2014 Sivasubramanian ........................ F02D 19/081 123/399
2015/0090222 A1* 4/2015 Rebinsky ............ F02D 41/0027 123/435
2015/0233310 A1* 8/2015 Zhang ................ F02M 21/0224 701/54
2015/0345408 A1* 12/2015 Sivasubramanian ........................ F02D 19/0607 123/445
2015/0346180 A1* 12/2015 Yamada .............. F02D 41/1497 701/105
2015/0369716 A1* 12/2015 Sivasubramanian ........................ G01N 33/225 73/438
2016/0061705 A1* 3/2016 Mikami ................... G01N 9/26 73/30.02
2016/0169132 A1* 6/2016 Yeager ................ F02D 41/0025 701/103
2016/0320061 A1* 11/2016 Holcomb ................ F23N 1/002
2016/0327464 A1* 11/2016 Rasmussen ............. F02B 43/00
2017/0022919 A1* 1/2017 Rebinsky ........... F02M 21/0227
2017/0023503 A1* 1/2017 Rebinsky ............ F02D 41/0027
2017/0211505 A1* 7/2017 Anderson ........... F02D 41/3863
2017/0218837 A1* 8/2017 Zhong ..................... F02B 43/12
2017/0260917 A1* 9/2017 Burger .................... F02B 43/10
2018/0112622 A1* 4/2018 Atterberry .......... F02D 41/3005
2019/0024571 A1* 1/2019 Wang ...................... F02B 19/12
2023/0116609 A1* 4/2023 Guglielmo .......... F02D 19/0642 701/104
2024/0110525 A1* 4/2024 Guglielmo ............ F02D 19/027

FOREIGN PATENT DOCUMENTS

JP 2007303395 A * 11/2007
JP 6136550 B2 5/2017
JP 2019019748 A 2/2019
WO WO-2025042566 A1 * 2/2025
WO WO-2025042810 A1 * 2/2025

* cited by examiner

ENGINE SYSTEM AND METHOD FOR DETERMINING FUEL CHARACTERISTICS

TECHNICAL FIELD

The present disclosure relates determining a characteristic of fuel, and, more particularly, determining a characteristic of fuel for an internal combustion engine.

BACKGROUND

Internal combustion engines combust fuels to generate energy. While some engines operate in environments in which fuel characteristics are consistent, other engines are used in environments where fuel characteristics change over time. The properties of a given fuel impact engine performance, emissions, fuel consumption, and other aspects of the combustion engine's operation.

As an example, specific gravity impacts engine performance as decreasing specific gravity tends to hasten the rate at which combustion occurs. Some engine systems are configured to adjust operation based on changes in the properties of fuel, including specific gravity, by allowing a user to manually enter values into, for example, a computing device associated with the engine. The computing device adjusts operational parameters of the engine in response to values received from the user, compensating for the change to the rate of combustion.

Physical properties of fuel, including specific gravity, may change, for example, when fuel obtained directly from a well or worksite. In at least some circumstances, changes to specific gravity or other fuel characteristics occur quickly. While existing systems that adjust based on specific gravity are useful, there are at least some occasions in which it is difficult to obtain an accurate specific gravity measurement to allow the internal combustion engine to perform adjustments and compensate for changes in the fuel.

A specific gravity detection device for an internal combustion engine is described in JP 2019019748 A ("the '748 publication") to Takano. A fuel pressure detection unit described in the '748 publication detects fuel pressure and a specific gravity of fuel is based on a calculated fuel density. While the detection unit described in the '748 publication may be useful for estimating the specific gravity in some circumstances, it is unable to provide a specific gravity of fuel based on characteristics of a pressure signal such as amplitude, phase, and others.

Embodiments of the present disclosure may solve one or more of the problems set forth above and/or other problems in the art. The scope of the current disclosure, however, is defined by the attached claims, and not by the ability to solve any specific problem.

SUMMARY

In one aspect of the present disclosure, a method for determining a fuel characteristic may include receiving a gaseous fuel within a gaseous fuel rail of a dual fuel engine configured to run on at least the gaseous fuel and a diesel fuel. The method may include receiving a pressure signal from a pressure sensor indicating a pressure of the gaseous fuel within the gaseous fuel rail, and identifying at least one of an amplitude and a phase of the pressure signal. The method may also include determining a characteristic of the fuel within the fuel rail based on the amplitude or the phase of the pressure signal, and, based on the determined characteristic of the fuel, modifying an operational parameter of the dual fuel engine.

In another aspect of the present disclosure, a method may include receiving a gaseous fuel within a gaseous fuel rail for supplying the gaseous fuel to an internal combustion engine configured to run on at least gaseous fuel, and measuring a pressure signal of the gaseous fuel within the fuel rail. The method may include identifying at least one of an amplitude or a phase of the pressure signal, and determining a specific gravity of the fuel within the fuel rail based on the amplitude or phase of the pressure signal. The method may also include, based on the specific gravity of the fuel, performing one or more of: modifying an operational parameter of the combustion engine, displaying a warning on a display, or adjusting a quantity of the gaseous fuel.

In still another aspect of the present disclosure, a gaseous fuel specific gravity estimation system may include an internal combustion engine assembly configured to operate with at least gaseous fuel. The engine assembly may include a fuel system, and a fuel rail of the fuel system, the fuel rail configured to receive gaseous fuel. The system may include a sensor for measuring a pressure within the fuel rail, and a controller in communication with the sensor and configured to receive a pressure signal from a pressure sensor indicating a pressure of the gaseous fuel within the gaseous fuel rail, identify at least one of an amplitude and a phase of the pressure signal, determine a characteristic of the fuel within the fuel rail based on the amplitude or the phase of the pressure signal, and, based on the determined characteristic of the fuel, modify an operational parameter of the internal combustion engine.

BRIEF DESCRIPTION OF THE DRAWINGS

The accompanying drawings, which are incorporated in, and constitute a part of, this specification, illustrate various exemplary embodiments and, together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of +10% in the stated value. As used herein, "based on" is intended to encompass "based, at least in part, on" unless explicitly stated otherwise.

Figure 1:
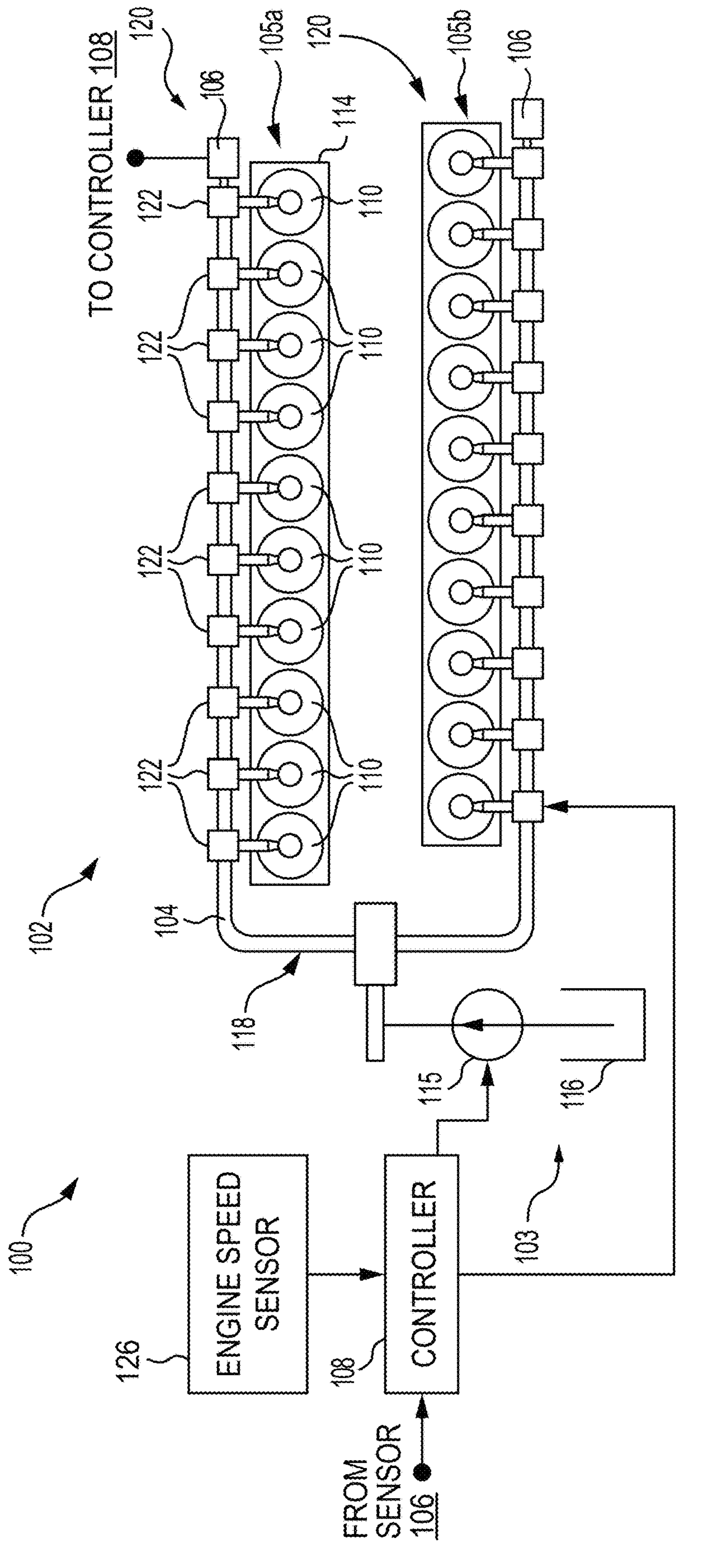
FIG. 1 is a schematic view of a combustion engine assembly, according to aspects of this disclosure.

FIG. 1 shows a schematic view of an exemplary gaseous fuel specific gravity estimation system 100 (system 100) for, e.g., a mobile industrial machine or stationary industrial machine. Suitable mobile machines include an earth moving machine, excavator, a wheel loader, a bulldozer, a motor grader, an articulated truck, a skid steer loader, or a backhoe, to name some examples. Stationary machines include power generation systems, hydraulic power units, and others.

System 100 may include a fuel combustion engine assembly 102 (engine assembly 102) including an internal combustion engine 114 having one or more cylinder banks, such as cylinder banks 105*a* and 105*b*, and a fuel system 103 for supplying fuel to engine 114. Engine assembly 102 may be configured as a dual fuel system or a single fuel system (e.g., where fuel is ignited via a spark plug). For example, internal combustion engine 114 may receive a primary fuel via fuel system 103, which may be a gaseous fuel. As used herein, a "gaseous fuel" is a fuel that is delivered to a fuel injection device (e.g., an admission valve or fuel injector) while in a gaseous state. Internal combustion engine 114 may also be configured to receive a pilot fuel via fuel system 103. The pilot fuel may be, for example, a liquid fuel such as diesel fuel. As used herein, a "liquid fuel" is a fuel that is supplied to a fuel injection device (e.g., a fuel injector) while in a liquid state. A spark plug may enable system 100 to operate entirely on gaseous fuel, without supply of a pilot fuel, such as diesel fuel.

System 100 may further include a sensor 106 coupled to fuel system 103, a controller or electronic control module (ECM) 108, and an engine speed sensor 126 in communication with to controller 108. Controller 108 may include a specific gravity estimator 129 (FIG. 2) configured to estimate the specific gravity of the fuel, as described herein.

Fuel system 103 may include a fuel source 116, a fuel pump 115, a fuel rail 104, and a plurality of a gas admission valves (GAV) 122 connected to a plurality of cylinders 110 of banks 105*a-b*, for port fuel injection or direct fuel injection. Cylinder banks 105*a-b* may each include appropriate components, such as cylinders 110, pistons, cylinder heads, engine blocks, spark plugs, valves, etc.

Cylinder banks 105*a-b* may extend generally parallel to gaseous fuel rail 104, rail 104 having a generally U-shaped configuration, ends 120 of rail 104 formed as branches that are opposite first end 118. While fuel rail 104 may generally be U-shaped, it may take the form of any appropriate geometry, including an H-shaped configuration where fuel is input to a center portion of the "H." Each GAV 122 may be fluidly connected between fuel rail 104 and each cylinder 110 for port or direct fuel injection, and may be configured to selectively supply fuel to a respective cylinder 110. While GAV 122 may be connected for injection via cylinder intake ports (e.g., cylinders 110 may be port-injected), GAV 122 may take the form of direct fuel injection, as described above. In some embodiments, GAV 122 may be located downstream of the fuel pump 155 and upstream of the illustrated branches of fuel rail 104. In some embodiments, GAV 122 may be positioned in a bypass path upstream of the illustrated branches of fuel rail 104. In other embodiments, GAV 122 and sensor 106 may be positioned in a bypass path upstream of the illustrated branches of fuel rail 104. In such embodiments, GAV 122 may be upstream of sensor 106 within the bypass path. Fuel system 103 may be any appropriate fuel system, and may operate on gaseous and/or liquid fuels. Suitable gaseous fuels may include natural gas, hydrogen gas, propane, butane, etc.

Sensor 106 may be a pressure sensor, e.g., a fuel rail pressure sensor. Sensor 106 may be communicatively coupled to controller 108 and configured to send fuel pressure data to controller 108. Sensor 106 may continuously or periodically sense the fuel pressure in fuel rail 104 and feed the data to controller 108 in real time or near real time. As shown in FIG. 1, sensor 106 may include one or two sensors located at second end 120 of fuel rail 104. In particular, when GAV 122 opens, the pressure in fuel rail 104 changes according to a pressure signal. Sensor 106 may send the measured pressure signal to controller 108 for further processing, as discussed herein, including determination of a specific gravity of the fuel in engine assembly 102. Sensor 106 may be positioned at any appropriate part of system 100. In some configurations, sensor 106 may be located downstream of the fuel pump 155 and upstream of the illustrated branches of fuel rail 104. In some configurations, sensor 106 may be positioned in a bypass path upstream of the illustrated branches of fuel rail 104. In other embodiments, GAV 122 and sensor 106 may be positioned in a bypass path upstream of the illustrated branches of fuel rail 104. In such embodiments, sensor 106 may be immediately downstream GAV 122 within the bypass path. In some implementations, fuel system 103 may include at least two sensors 106, but may include any appropriate number of sensors 106. In some implementations, system 100 may include a second fuel sensor 106 may be located at second end 120 of fuel rail 104.

Controller or ECM 108 may include a single processor or multiple processors configured to receive inputs, display outputs, and generate commands to control the operation of components of system 100. Controller 108 may include a memory, a secondary storage device, processor(s), such as central processing unit(s), networking interfaces, or any other means for accomplishing tasks consistent with the present disclosure. The memory or secondary storage device associated with controller 108 may store data and software to allow controller 108 to perform its functions, including the functions described below with respect to method 800 (FIG. 8) and the functions of system 100 described with respect to FIGS. 1-7B. One or more of the devices or systems communicatively coupled to the controller 108 may be communicatively coupled over a wired or wireless network, such as the Internet, a Local Area Network, WiFi, Bluetooth, or any combination of suitable networking arrangements and protocols. For example, controller 108 may be coupled to a display.

Figure 2:
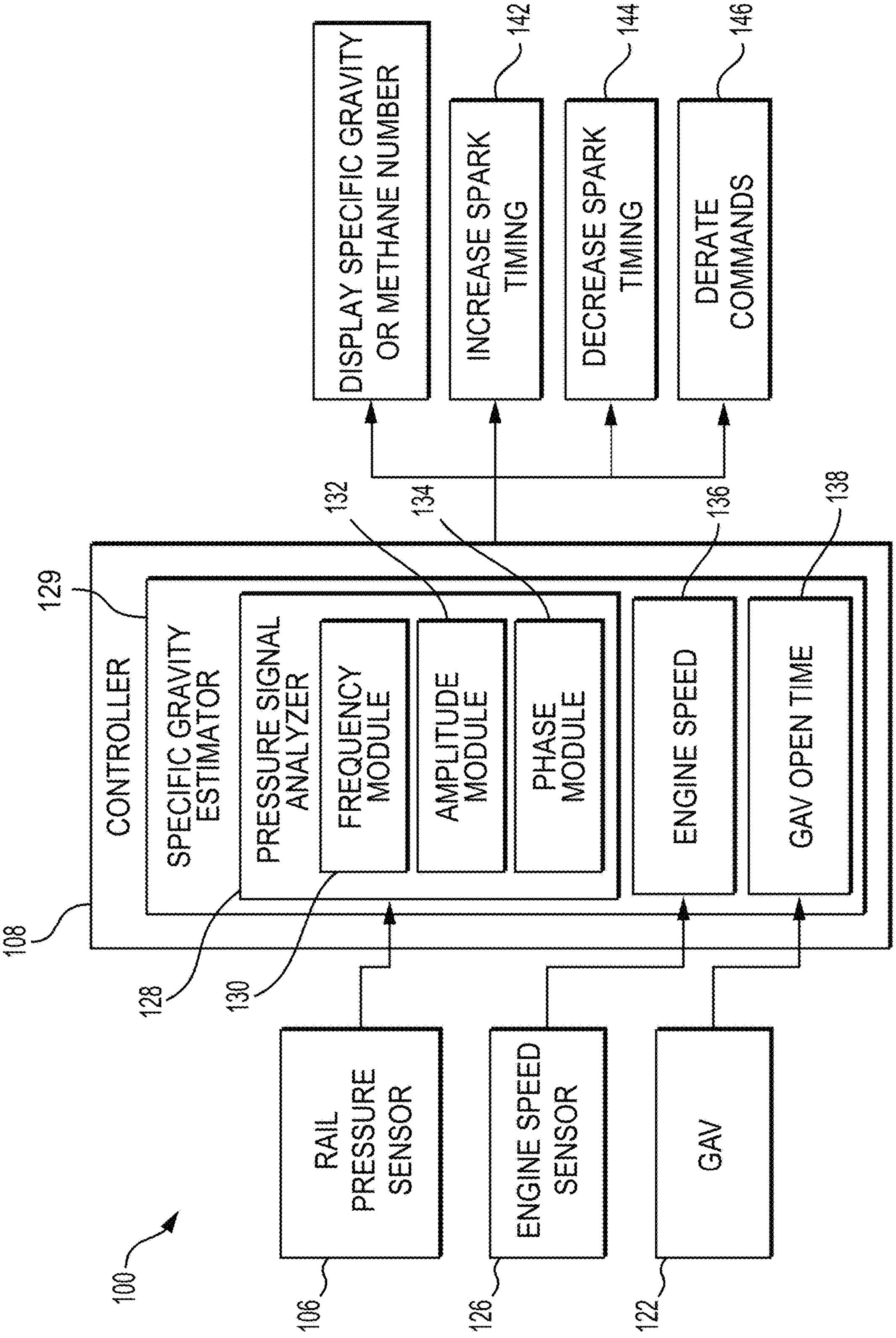
FIG. 2 is a functional block diagram of the combustion engine assembly of FIG. 1.
Figure 3:
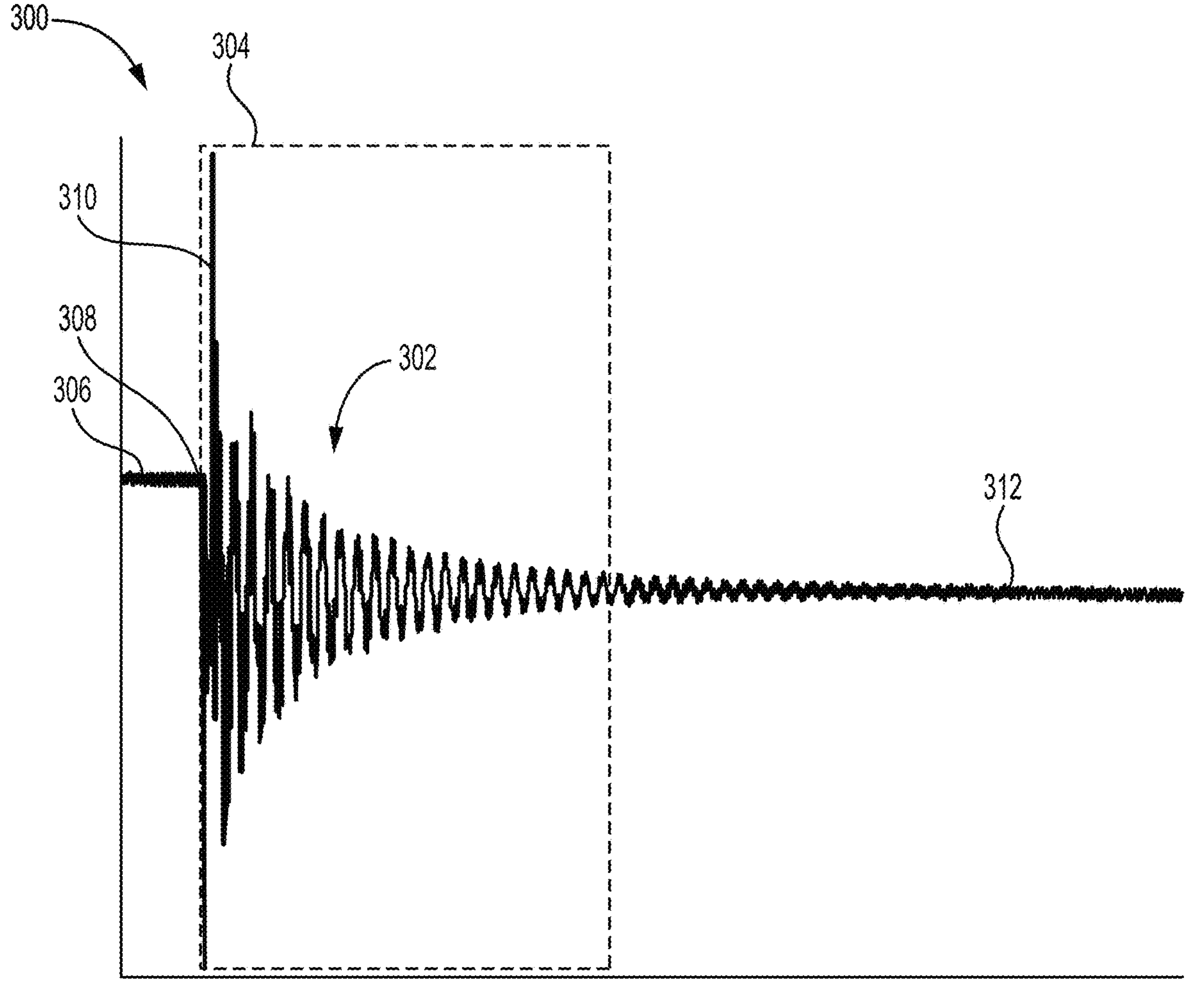
FIG. 3 is a graph of a fuel pressure signal of a fuel in the combustion engine assembly of FIGS. 1 and 2.

FIG. 2 shows a functional block diagram of system 100 illustrating inputs to and outputs from controller 108 as well as an example configuration of controller 108. Controller 108 may be configured to measure fuel pressure within fuel rail 104 through sensor 106. When fuel pressure changes, caused for example by GAV 122, controller 108 may receive a pressure signal that represents this change, as shown in FIGS. 2 and 3. With reference to FIG. 2, controller 108 may be configured to identify, e.g., through sensor 106, and analyze a pressure signal having a frequency, an amplitude, and a phase with a pressure analyzer 128.

Controller 108 may be configured to determine, after the pressure signal is received with pressure signal analyzer 128 is received, a specific gravity or methane number of the fuel within fuel rail 104 based on the pressure signal. The phrase "specific gravity," as used herein, encompasses a fuel's density and/or the methane number of the fuel. Thus, the phrase "specific gravity" is understood to refer to a fuel's "specific gravity, methane number, or specific gravity and methane number." When discussing specific gravity levels herein, it is understood that lower specific gravities tend to correlate with higher methane numbers in gaseous fuels. Similarly, it is understood that higher specific gravities correlate with lower methane numbers. Thus, when specific gravity is described herein as "low" or "decreasing," methane number may be high or increasing, and vice versa.

Controller 108 may respond to changes in the specific gravity of the fuel, these changes being identified with specific gravity estimator 129. Controller 108 may measure the change in specific gravity of the fuel while engine assembly 102 is at startup or while engine assembly 102 is operative. Controller 108 may also monitor other metrics associated with system 100, including a speed of a crankshaft of engine assembly 102 through an engine speed sensor 126 and other sensors for operating engine 114. Controller 108 may monitor, e.g., fuel pressure, airflow, speed of engine 114, etc. Any of the metrics may be measured automatically (e.g., without user input) or manually (e.g., with user input).

Specific gravity estimator 129 may be configured to estimate the specific gravity of gaseous fuel (e.g., a primary fuel of system 100) based on amplitude and/or phase of a pressure signal analyzed with pressure signal analyzer 128. Specific gravity estimator 129 may be further configured to cause controller 108 to modify an operational parameter of engine 114 based on the estimated specific gravity.

Pressure signals processed with analyzer 128 include characteristics such as a frequency, amplitude, and phase, which are identified with a frequency module 130, amplitude module 132, and phase module 134, respectively. The frequency identified with frequency module 130 may correspond to the number of wave cycles that pass a fixed point at a given unit of time, e.g., as measured in Hertz, which is the number of cycles per second. The amplitude identified with amplitude module 132 may represent, e.g., pressure of the gaseous fuel in fuel rail 104. When this pressure is displaced from an equilibrium (e.g., steady state), amplitude may fluctuate (e.g., repeatedly increase and decrease). The phase identified with phase module 134 may correspond to differences between wave signals, different waves formed by the pressure signal. Pressure signals may have different frequencies, amplitudes, and phases over a given period of time. In addition to signals from rail pressure sensor 106, controller 108 may receive an engine speed 136 from engine speed sensor 126. GAV open time 138 may correspond to commands issued to GAV 122 and/or feedback received from GAV 122.

Figure 4:
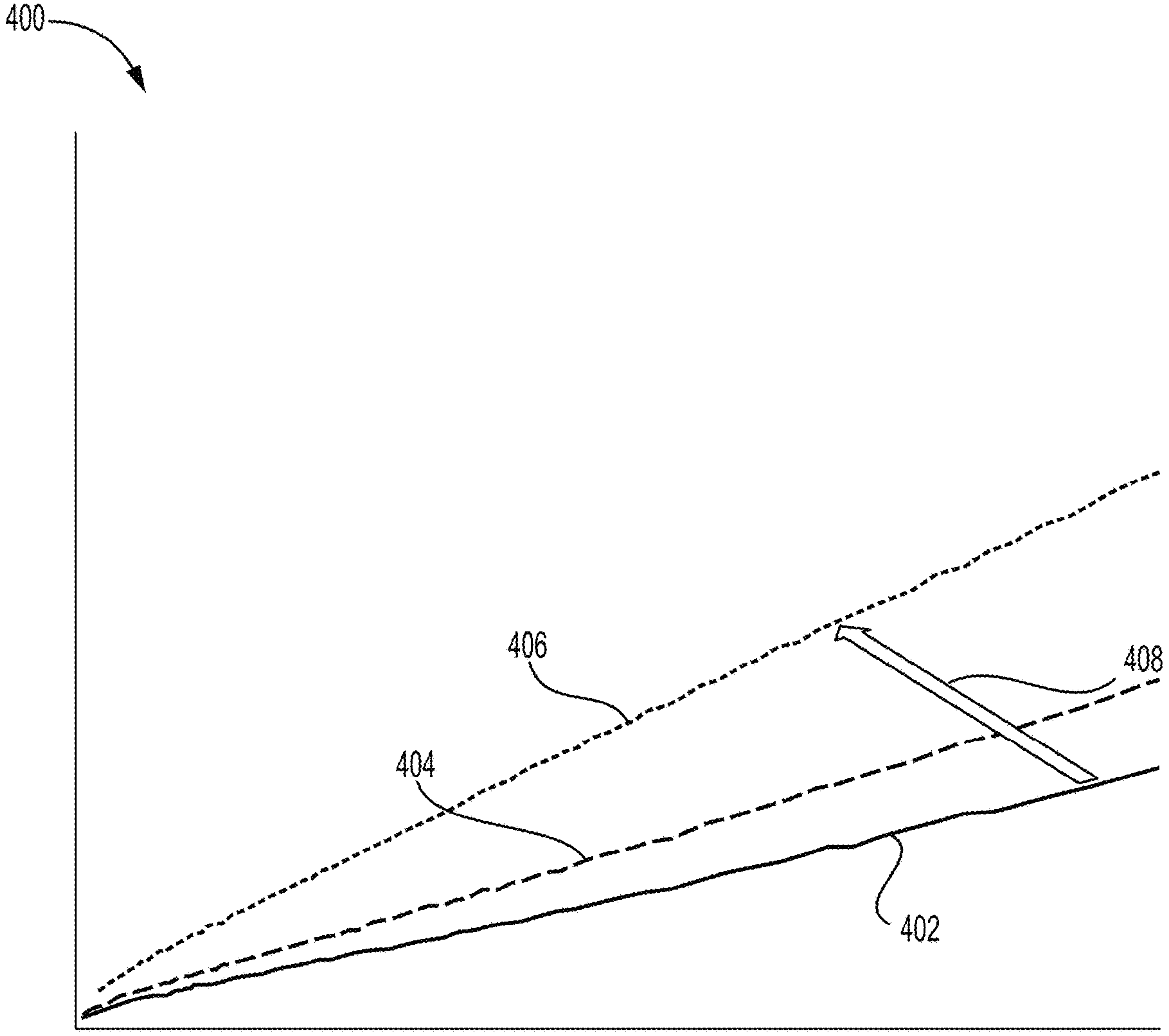
FIG. 4 is a graph showing integral values for pressure signals of fuels with different specific gravity values.

To determine specific gravity of gaseous fuel, specific gravity estimator 129 of controller 108 may calculate absolute values of fluctuations in the pressure signal with amplitude module 132 of pressure signal analyzer 128. Identified amplitudes may be integrated with respect to, e.g., time or pressure as shown in FIG. 4 and described below. In another example, shown in FIGS. 5 and 7A-B and described below, pressure signal analyzer 128 may perform a Fast Fourier Transform on the pressure signal with frequency module 130 to transform the data contained in the signal to the frequency domain and estimate specific gravity based on a phase lag (e.g., a time or frequency lag) between pressure signals 502, 504, and 506, and 702, 704, and/or 706.

Controller 108 may, in real time and/or with or without user input, modify one or more operational parameters of engine assembly 102 via specific gravity estimator 129, based on the estimated specific gravity. For example, specific gravity estimator 129 may output the estimated specific gravity via a display in communication with the controller 108. If the specific gravity falls below a minimum specific gravity threshold value or exceeds a maximum specific gravity threshold value, then specific gravity estimator 129 may cause a warning to be displayed alerting a user to the estimated specific gravity value. The display may include a number (e.g., the estimated value of the specific gravity of the fuel) and/or a color display. For example, the display may display green lights when the specific gravity is within a first range, or display a warning including yellow lights when the specific gravity is outside the first range and within a second range wider than the first range, or red lights when the specific gravity is within a third range wider than the first or second ranges.

In some examples, specific gravity estimator 129 of controller 108 may modify an operational parameter of the engine assembly 100 based on the determined specific gravity. Specific gravity estimator 129, based on the determined specific gravity, may, e.g., advance or retard spark timing for one or more cylinders 110 and/or change fuel injection timing of cylinders 110.

For example, if the specific gravity is below a threshold value, such as a first specific gravity threshold value, specific gravity estimator 129 may generate one or more commands 142 to advance spark timing (e.g., cause spark plugs to fire earlier) or advance fuel injection of a primary gaseous fuel and/or of a pilot fuel. If the specific gravity is above the first specific gravity threshold value, controller 108 may generate one or more commands 144 to retard spark timing (e.g., the spark plugs fire later) and/or delay fuel injection.

In conditions where the specific gravity is above a threshold value, such as a second specific gravity threshold that is above the first specific gravity threshold, specific gravity estimator 129 may signal fuel system 103 to reduce the relative amount of primary fuel to the amount of pilot fuel. This may include decreasing the amount of primary fuel, increasing the amount of pilot fuel, or both. In some configurations, controller 108 may operate solely on pilot fuel (e.g., diesel fuel) when the specific gravity is below a second specific gravity threshold.

In some examples, when the specific gravity of the fuel is above a threshold value, such as a third specific gravity threshold value that is more than the first or second specific gravity threshold values, specific gravity estimator 129 may derate engine assembly 102 by sending derate commands 146 to GAV 122 and/or other components of fuel system 103. "Derating" an engine refers to reducing the maximum power output and/or speed to a level that is below design specifications (e.g., rated power or rated speed). Derating engine assembly 102 may be beneficial when, e.g., the available fuel has a low specific gravity and/or a temperature of engine assembly 102 is above a predetermined temperature threshold. Engine assembly 102 may be derated to a wide range of speeds and/or power outputs, or shutdown if desired, depending on the specific gravity of the fuel. For example, controller 108 may derate engine assembly 102 to a slow speed or low power output (e.g., 50% of rated speed or power, or less), based on the estimated specific gravity value.

INDUSTRIAL APPLICABILITY

Gaseous fuel specific gravity estimation system 100 may be used for determining a physical characteristic of a fuel in an engine before or during operation. In particular, system 100 may determine a specific gravity of a fuel in fuel rail 104 connected to an engine, and may change an operational parameter of the engine without user input. By changing an operational parameter of the engine in response to changing physical characteristics of the fuel and without user input, system 100 may increase the performance and lifespan of the engine while lowering fuel consumption. The system and methods described herein may be useful for a wide variety of combustion engines, including gas and diesel engines, and other gaseous or liquid fuel engines.

Specific gravity estimation system 100 may employ one or multiple strategies for analyzing a pressure signal with analyzer 128 and estimating specific gravity with estimator 129, as described below. In some aspects, one or more strategies may be employed in a controlled condition (e.g., in response to a request for a test of fuel for engine 114, at startup, at shutdown, etc., during which normal operation of engine 114 is not performed or suspended). In other aspects, one or more strategies may be performed during operation of an engine 114, with or without receiving a request for a fuel test. Example strategies are described below with respect to FIGS. 3-8.

FIG. 3 shows a graph 300 of a pressure signal 302 (an example of a pressure signal received with pressure signal analyzer 128 from pressure sensor 106) corresponding to a change in pressure in a fuel in fuel rail 104. Pressure signal 302 may correspond to pressure signals from rail pressure sensor 106 during a fuel test. The horizontal axis may represent time (e.g., seconds or minutes) while the vertical axis may be pressure (e.g., pascals or bar) of a fuel within fuel rail 104. Oscillating portion 304, enclosed within a box in FIG. 3, denotes a portion of potential interest in pressure signal 302 (e.g., a portion of signal 302 analyzed with pressure signal analyzer 128), where the greatest change to the pressure signal relative to a steady state at point 306 may be observed. Specifically, the primary fuel pressurized within fuel rail 104 may reach a substantial equilibrium or steady state, where the pressure of the primary fuel is approximately constant, represented by portion 306.

The pressure is in an approximately steady state, at portion 306, with fuel rail 104 being in a sealed state. GAV 122 may open at point 308 following portion 306, supplying gaseous fuel to a respective cylinder 110 via fuel rail 104, and immediately closing to seal fuel rail 104. At point 308 the pressure in fuel rail 104 changes, as represented with fluctuating pressure signal 302. At point 310, the greatest value of change occurs in the pressure of the fuel in fuel rail 104. After a given amount of time, oscillations in pressure signal 302 damp until reaching another, lower, steady state at point 312. The amount of time from point 308 to point 312 may be, for example, 1 second.

FIG. 4 shows a graph 400 of integrated pressure signals 402, 404, and 406 that may be used to estimate specific gravity via a first strategy. The horizontal axis may be differential pressure values of the fuel within fuel rail 104, while the vertical axis may be the integrated absolute value of amplitudes contained in the pressure signal 302.

Pressure signals (e.g., amplitude values identified with module 132) may be integrated with respect to, e.g., pressure, and may correspond to portion 304 (FIG. 3). A higher slope (e.g., steepness, as indicated by the trend line arrow 408) in FIG. 3 represents increasing specific gravity. For example, integrated pressure signal 506 may correspond to a higher specific gravity than integrated pressure signals 504 and 502 and integrated pressure signal 504 may indicate a higher specific gravity than integrated pressure signal 502.

Figure 5:
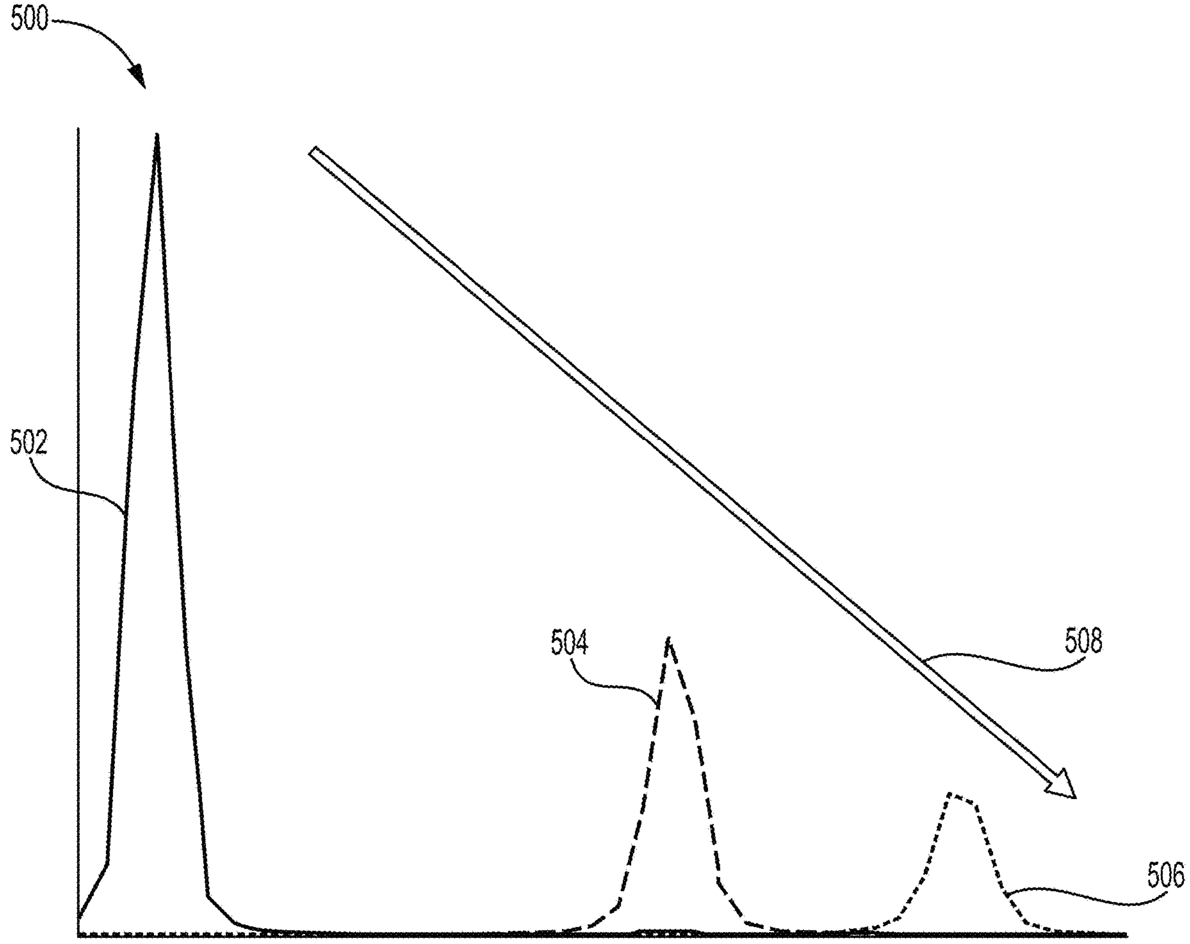
FIG. 5 is a graph showing a shift in frequency for pressure signals of fuels with different specific gravity values.

FIG. 5 shows a graph 500 of estimated specific gravities of fuels in the frequency domain according to a second strategy for estimating specific gravity. The horizontal axis may be frequency (e.g., Hertz), while the vertical axis may be pressure of the fuel within fuel rail 104. Pressure signal may be converted from a pressure signal waveform (shown in FIG. 3) to a frequency domain waveform when frequency module 130 performs a Fast Fourier Transform operation on pressure signal. Once transformed into the frequency domain, the amplitudes (e.g., peaks) and phase (e.g., horizontal position) of signals 502, 504, and 506 may indicate a specific gravity of a fuel. Specifically, a higher peak (e.g., that of pressure signal 502) may indicate a higher specific gravity value than a lower peak (e.g., those of pressure signals 504 or 502). Trend line 508 may indicate the decreasing estimated specific gravity with decreasing amplitude and changing phase (position along horizontal axis).

Figure 6:
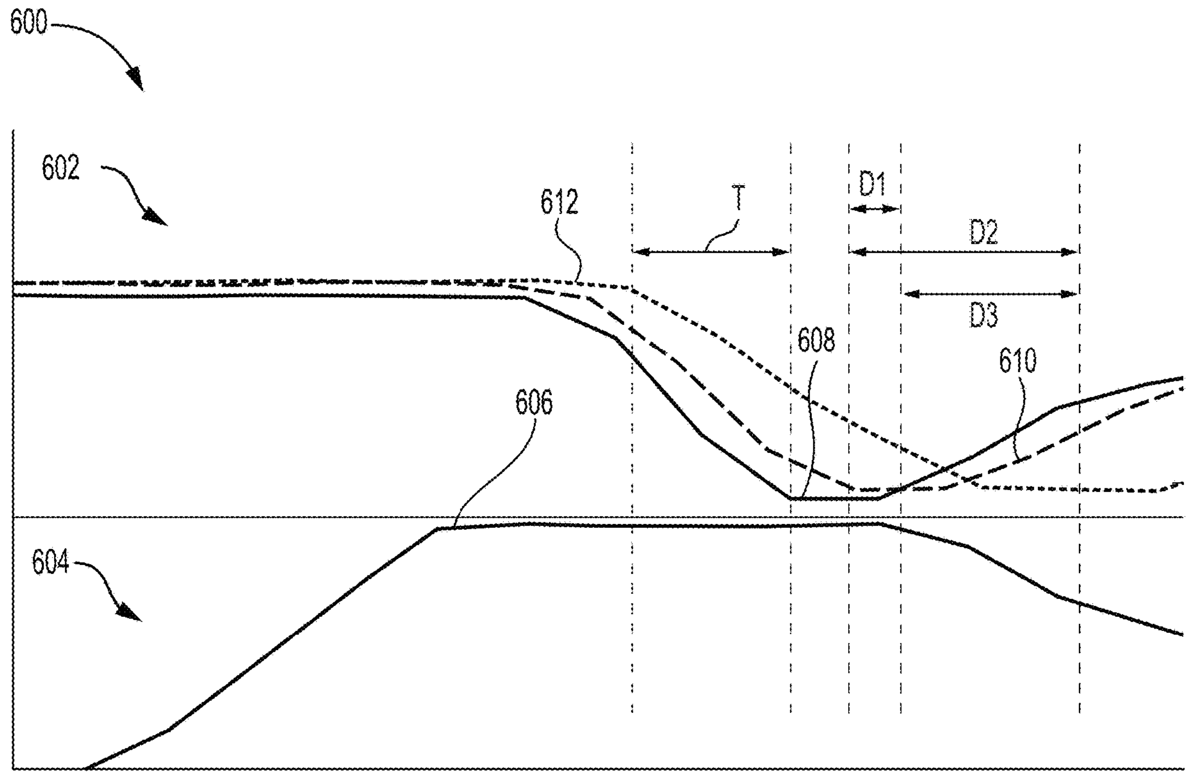
FIG. 6 is a graph showing a phase shift of pressure signals of fuels with different specific gravity values.

FIG. 6 shows a graph 600 of a phase shift (e.g., time or frequency shift) of example waveforms 608, 610, and 612 that may be used to estimate specific gravity via a third strategy for estimating specific gravity. FIG. 6 includes two portions, an upper portion 602 and a lower portion 604. Upper portion 602 illustrates pressure (vertical axis) of fuel within fuel rail 104 with respect to time (horizontal axis). Lower portion 604 represents a GAV command 606 (e.g., current in the form of current provided to open a solenoid valve) in the vertical axis, with respect to time, with portions 602 and 604 sharing the same time axis.

Higher values of command 606 for GAV 122 cause GAV 122 to open to provide fuel in cylinders 110, with low levels of command 606 acting to close GAV 122. Portions 602 and 604 are separated by a solid horizontal line for clarity. Upper portion 602 illustrates three different responses, waveforms 608, 610, and 612 in the pressure signal to the same GAV command illustrated in lower portion 604.

Waveforms 608, 610, and 612 indicate pressures of the fuel, measured with sensor 106, in response to actuation of GAV 122. For example, when GAV 122 opens in response to command 606, each of waveforms 608, 610, and 612 begin to decrease as pressure in fuel rail 104 begins to fall, with waveform 612 showing the slowest response time to the opening of GAV 122 corresponding to command 606. In particular, in period of time T shown in FIG. 6, waveform 608 has the most rapid response and the lowest lag, waveform 612 has the slowest response and greatest lag, and waveform 610 has response and lag between waveforms 608 and 612.

Distances D1, D2, and D3 in FIG. 6 show distances between the dashed vertical that line indicates a phase lag (in the time or frequency domains) between waveforms 608, 610, and 612. D1 represents the distance between troughs of waveforms 608 and 610, D2 represents the distance between troughs of waveforms 608 and 612, and D3 represents the distances between troughs of waveforms 610 and 612. In particular, distances D1, D2, and D3 are out of phase with each other. Controller 108 may estimate a specific gravity based on the phase lag (e.g., the difference in distances D1-D3) between waveforms 608, 610, and 612. The estimated specific gravity of the fuels may increase with increasing magnitude D1, D2, or D3 of the phase lag between pressure signals 608, 610, and 612.

While not shown in FIG. 6, in some configurations, waveforms 608, 610, and 612 are transformed into the frequency domain via a Fast Fourier Transform operation performed by specific gravity estimator 129. The above-described second strategy may be similarly applied to waveforms transformed into the frequency domain.

Figure 7A:
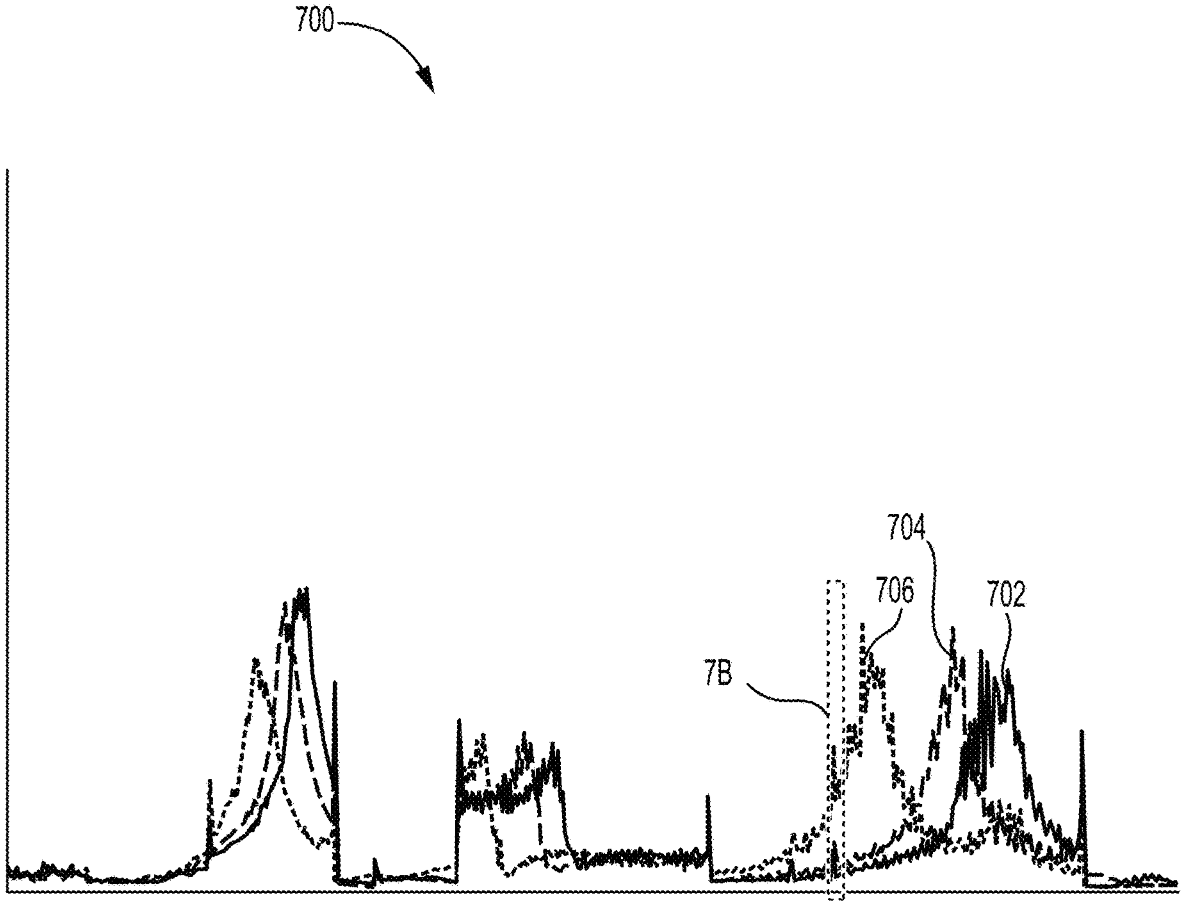
FIG. 7A is a graph showing pressure signals for fuels with different specific gravity values.
Figure 7B:
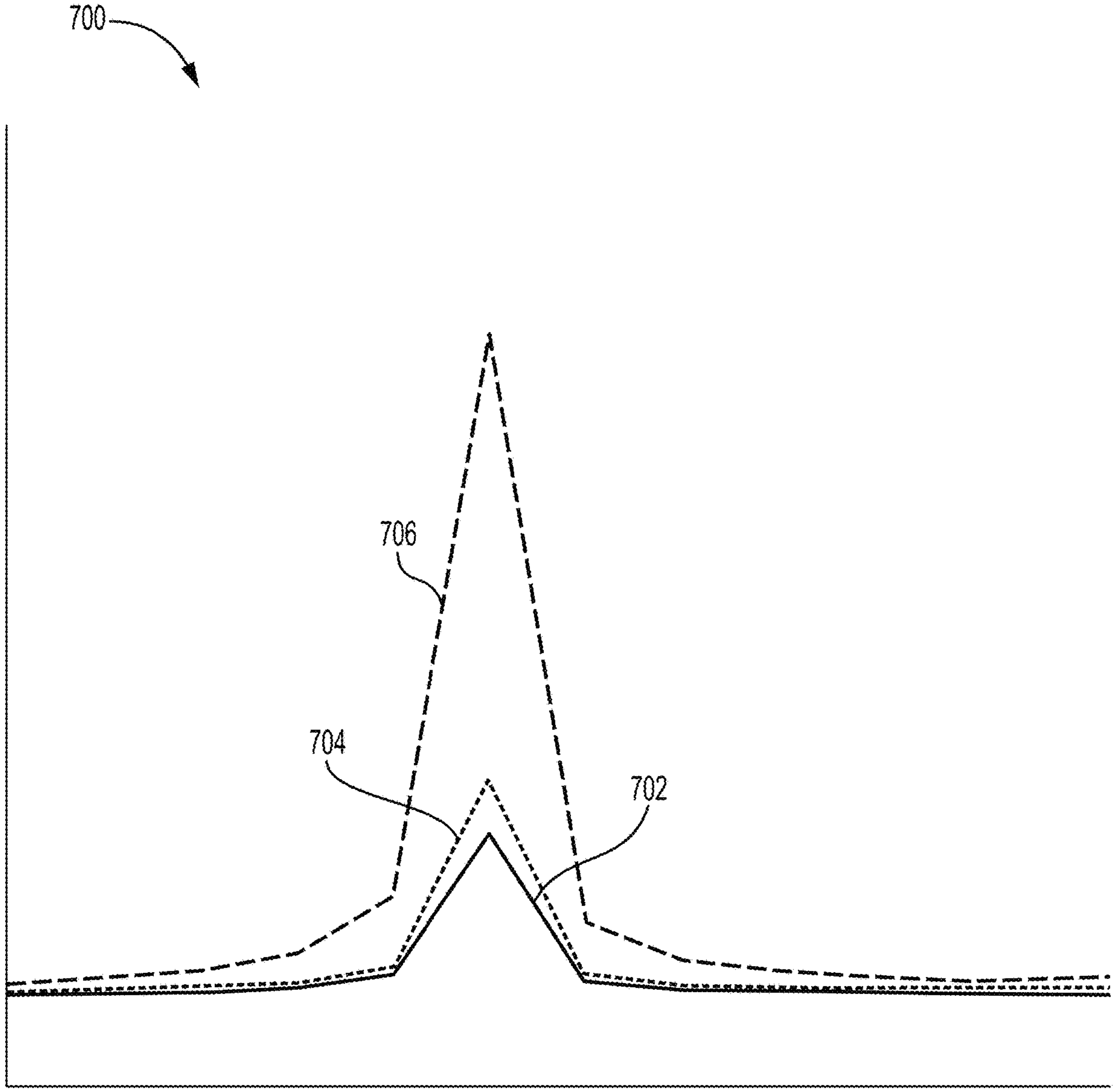
FIG. 7B is an enlarged illustration of the pressure signals at point 7B of FIG. 7A.

FIG. 7A shows a graph 700 of example gaseous fuel pressure signals from sensor 106. FIG. 7B shows an enlarged illustration of box 7B (illustrated as a dashed box) in FIG. 7A. In both of FIGS. 7A and 7B, the horizontal axis represents frequency, while the vertical axis represents pressure of a fuel within fuel rail 104. In particular, transfer functions 702, 704, and 706 in FIGS. 7A and 7B are pressure signals transformed into the frequency domain by frequency module 130 of specific gravity estimator 129 via the Fast Fourier Transform operation. The amplitude (e.g., height along the vertical axis) of transfer functions 702, 704, and 706 may be correlate with increasing specific gravity, as in the second strategy. For example, as illustrated in FIG. 7B, transfer function 706 may indicate a higher estimated specific gravity than transfer functions 704 or 702. Similarly, transfer functions 704 may indicate a higher estimated specific gravity than transfer function 702.

Figure 8:
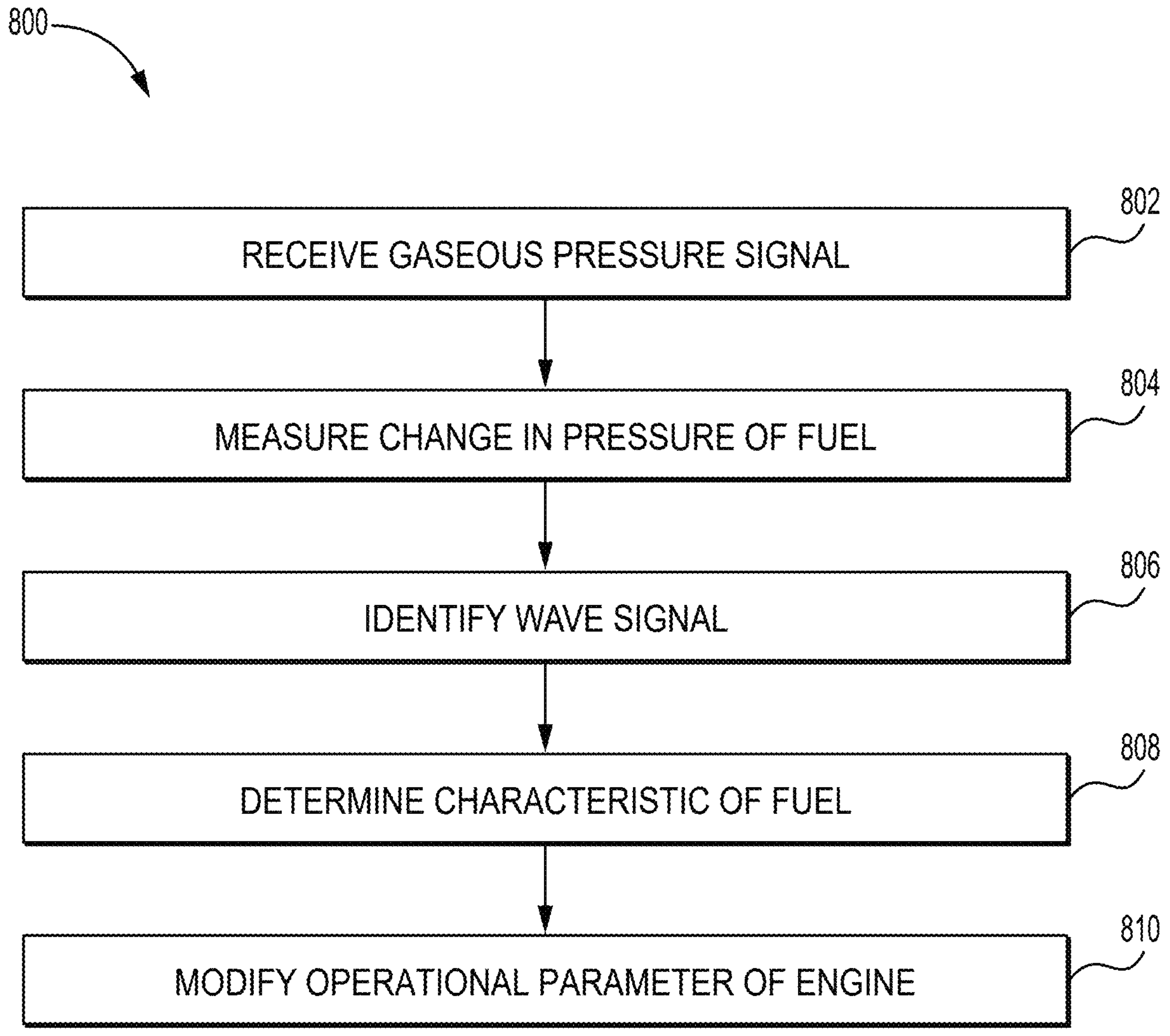
FIG. 8 is a flowchart of an exemplary method of determining a characteristic of a fuel.

A method 800 of determining a characteristic of a fuel is illustrated by representative steps consistent with the present disclosure in the flowchart in FIG. 8. For the method of FIG. 8, the steps in which the method is described are not intended to be construed as a limitation. Any number of steps may be combined in any order to implement the disclosed method and can be performed in parallel to implement the processes. In some embodiments, one or more steps of the processes may be omitted entirely. Moreover, the processes can be combined in whole or in part with other methods and/or in a different order.

Method 800 may include a step 802, including receiving and/or pressurizing the fuel in fuel rail 104 to, e.g., the steady state point 306 shown in FIG. 3. Fuel may be pressurized by, e.g., fuel pump 115 and/or a pressure regulator. In some implementations, step 802 of method 800 may further include initiating a change in the pressure of the fuel from the pressurized state by opening GAV 122 for a period of time and closing GAV 122 to seal fuel rail 104.

Method 800 may include a step 804, including receiving pressure signal from pressure sensor 106 with pressure signal analyzer 128 of controller 108. As indicated above, step 804 may be performed during normal operation of engine 114 and/or as part of a fuel test.

Method 800 may include step 806, including identifying the frequency, amplitude, and phase of pressure signal with modules 130, 132, and 134. These aspects of the pressure signal may represent changes in the pressure of the fuel caused by, e.g., the opening of GAV 122. In some analyses, all three of the amplitude, phase, and frequency are identified and analyzed. In other analyses, only amplitude, only frequency, only phase, or a combination of amplitude and frequency, a combination of amplitude and phase, or a combination of frequency and phase are identified and analyzed, according to the strategy or strategies employed by specific gravity estimator 129.

As illustrated in FIG. 8, method 800 may include a step 808, including determining a characteristic of the fuel within fuel rail 104 based on pressure signal. Step 806 may be performed by applying one or more strategies for determining a characteristic (e.g., a specific gravity) of the primary fuel.

For example, step 808 may include applying a first strategy that includes integrating pressure signal with respect to delta pressure, as shown in FIG. 4, and comparing the integrated signal to an expected value, such as an expected slope. For example, a memory of estimator 129 may include a map or lookup table that associates different slopes with specific gravity values. Additionally or alternatively, the first strategy, as shown in FIG. 5, may include comparing the slopes of integrated signals 502, 504, and 506, with expected values or previously-measured values to estimate specific gravity.

In a second strategy, as shown in FIG. 6, the specific gravity of the primary fuel may be estimated by comparing the phase shift to an expected phase shift, to a previously-estimated phase shift, etc., as described above. FIGS. 7A and 7B show a third strategy for determining the specific gravity of the primary fuel by comparing the amplitudes of phase-shifted pressure signals 702, 704, and 706 to each other, to expected amplitudes, or to previously-measured amplitudes. As shown in FIG. 7B, the pressure signals may be compared to one another at a particular frequency, an example of this frequency being indicated with dashed line 7B of FIG. 7A.

Step 808 may also include determining amplitude of the pressure of the fuel within fuel rail 104 by either the first, second, or third strategies, e.g., by integrating the pressure signal (first strategy), a function of frequency (second strategy), or phase lag (third strategy). For example, as shown in FIGS. 5-7B, specific gravity estimator 129 may perform a Fast Fourier Transform operation on pressure signals to convert them into waveforms 502, 504, 506, 608, 610, 612, and 704, 706, 708.

Method 800 may further include step 810, including, based on the estimated specific gravity of the fuel, modifying an operational parameter of engine assembly 102. For example, if the estimated specific gravity is below a first specific gravity threshold value, then controller 108 may advance spark timing (e.g., generate commands that cause spark plugs fire sooner) for engines 114 that are spark ignited. Alternatively, if the specific gravity is above the first specific gravity threshold value, then controller 108 may retard spark timing (e.g., the spark plugs fire later). In other examples, such as when the specific gravity is above a specific gravity second threshold greater than the first specific gravity threshold, controller 108 may signal fuel system 103 to reduce the amount of primary fuel and increase the use of the pilot fuel (e.g., diesel). In conditions when the specific gravity of the fuel is above a third specific gravity threshold value that is greater than the first or second threshold values, controller 108 may derate engine assembly 102. For example, controller 108 may derate engine assembly 102 to a slow speed or low power output, based on the estimated specific gravity value. In another example, controller 108 may shut down engine assembly 102 entirely. In some implementations, method 800 may include comparing the estimated specific gravity of the fuel within fuel rail 104 with an expected specific gravity (e.g., a predetermined reference specific gravity) prior to modifying an operational parameter of engine assembly 102. In engines that are not spark ignited, controller 108 may adjust the primary and/or pilot fuel quantities at a second specific gravity threshold and derate engine 114 at a third specific gravity threshold. Other actions and thresholds may be used, instead of or in addition to the above-described examples.

The disclosed system and method may facilitate operation of engine assembly 102, even when engine assembly 102 is supplied with fuels having, e.g., different specific gravities. Estimation of specific gravity of fuel may improve transient performance, reduce emissions, and improve longevity of the internal combustion engine. Further, the systems and methods may eliminate the need for a user to manually enter a specific gravity value (including a methane number value in this disclosure), improving ease of use. The disclosed system and method may further allow for reduced down-time, thereby minimizing costs.

It will be apparent to those skilled in the art that various modifications and variations can be made to the disclosed system and method without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method, comprising:

receiving a gaseous fuel within a gaseous fuel rail of a dual fuel engine configured to run on the gaseous fuel and a diesel fuel;

initiating a change in the pressure of the gaseous fuel by opening a gas admission valve (GAV) configured to supply fuel from the gaseous fuel rail to an engine cylinder;

closing the GAV to seal the gaseous fuel rail;

receiving a pressure signal from a pressure sensor indicating a fluctuating pressure of the gaseous fuel within the gaseous fuel rail;

identifying a phase lag of the pressure signal;

determining a characteristic of the gaseous fuel within the gaseous fuel rail based on the phase lag of the pressure signal; and based on the determined characteristic of the gaseous fuel, modifying an operational parameter of the dual fuel engine.

2. The method of claim 1, further comprising:

initiating a change in the pressure of the gaseous fuel by opening a gas admission valve (GAV) configured to supply fuel from the gaseous fuel rail to an engine cylinder;

closing the GAV to seal the gaseous fuel rail; and determining the characteristic of the gaseous fuel based on an amplitude value, in addition to the phase lag of the pressure signal, resulting from the opening of the GAV.

3. The method of claim 1, further comprising:

applying a strategy that includes integrating the pressure signal for determining the characteristic of the gaseous fuel based on an amplitude of the pressure signal in addition to the phase lag of the pressure signal.

4. The method of claim 1, wherein modifying the operational parameter of the dual fuel engine includes adjusting a spark timing of the dual fuel engine.

5. The method of claim 1, further comprising, based on the determined characteristic of the gaseous fuel, displaying a warning on a display.

6. The method of claim 1, further comprising, based on the determined characteristics of the gaseous fuel, adjusting a quantity of the gaseous fuel.

7. The method of claim 1, further comprising determining the characteristic of the gaseous fuel within the gaseous fuel rail as part of a start-up test of the dual fuel engine.

8. A method, comprising:

initiating a change in a pressure of a gaseous fuel within a gaseous fuel rail by opening a gas admission valve (GAV) configured to supply the gaseous fuel from the gaseous fuel rail to an engine cylinder of an internal combustion engine;

closing the GAV to seal the gaseous fuel rail;

receiving a pressure signal representing the pressure of the gaseous fuel;

identifying a phase lag or a time lag of the pressure signal after the GAV has closed;

determining a specific gravity of the gaseous fuel within the gaseous fuel rail based on the phase lag or the time lag of the pressure signal; and based on the specific gravity of the gaseous fuel, performing one or more of:

modifying an operational parameter of the internal combustion engine, displaying a warning on a display, or adjusting a quantity of the gaseous fuel.

9. The method of claim 8, wherein modifying the operational parameter of the internal combustion engine includes retarding a spark timing of the internal combustion engine when the specific gravity of the gaseous fuel is above a threshold value.

10. The method of claim 8, including adjusting the quantity of the gaseous fuel supplied to the internal combustion engine via the gaseous fuel rail when the specific gravity of the gaseous fuel is above a threshold value.

11. The method of claim 8, wherein modifying the operational parameter of the internal combustion engine further includes derating the internal combustion engine when the specific gravity of the gaseous fuel is above a threshold value.

12. The method of claim 8, further comprising displaying the specific gravity on the display.

13. The method of claim 8:

further comprising comparing the specific gravity of the gaseous fuel within the gaseous fuel rail with an expected specific gravity of the gaseous fuel; and wherein the operational parameter of the internal combustion engine is modified based on the comparison of the specific gravity of the gaseous fuel with the expected specific gravity of the gaseous fuel.

14. The method of claim 8, wherein the specific gravity is determined while the internal combustion engine is operating and combusting the gaseous fuel.

15. A system, comprising:

an internal combustion engine assembly including an internal combustion engine configured to operate with at least a gaseous fuel, the internal combustion engine assembly including:

a fuel system; and a gaseous fuel rail of the fuel system, the gaseous fuel rail configured to receive the gaseous fuel;

at least one sensor for measuring a pressure within the gaseous fuel rail; and a controller in communication with the at least one sensor and configured to:

initiate a change in the pressure of the gaseous fuel by causing a gas admission valve (GAV) configured to supply fuel from the gaseous fuel rail to an engine cylinder to open;

cause the GAV to close to seal the gaseous fuel rail;

receive a pressure signal from the at least one sensor indicating a fluctuating pressure of the gaseous fuel within the gaseous fuel rail;

identify a phase lag of the pressure signal;

determine a characteristic of the gaseous fuel within the gaseous fuel rail based on the phase lag of the pressure signal; and based on the determined characteristic of the gaseous fuel, modify an operational parameter of the internal combustion engine.

16. The system of claim 15, wherein the at least one sensor includes at least two sensors.

17. The system of claim 15, wherein the at least one sensor is connected at an end of the gaseous fuel rail.

18. The system of claim 17, further comprising a gas admission valve (GAV) coupled between the gaseous fuel rail and a plurality of combustion cylinders, wherein the at least one sensor being configured to detect fluctuations in pressure caused by actuation of the GAV.

19. The system of claim 15, wherein the controller is further configured to, based on the determined characteristic of the gaseous fuel, adjust a spark timing of combustion cylinders of the internal combustion engine.

20. The system of claim 15, wherein the controller determines the characteristic of the gaseous fuel while the internal combustion engine is at startup or while the internal combustion engine is operative.

* * * * *